(12) United States Patent
Pizzorno et al.

(10) Patent No.: US 7,333,697 B2
(45) Date of Patent: Feb. 19, 2008

(54) DIELECTRIC OPTICAL FIBER CABLE HAVING IMPROVED INSTALLATION FEATURES

(75) Inventors: Massimo Pizzorno, Milan (IT);
Alessandro Ginocchio, Milan (IT);
Giovanni Brandi, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 0 days.

(21) Appl. No.: 10/565,634

(22) PCT Filed: Jul. 25, 2003

(86) PCT No.: PCT/EP03/08268

§ 371 (c)(1),
(2), (4) Date: Jul. 28, 2006

(87) PCT Pub. No.: WO2005/015280

PCT Pub. Date: Feb. 17, 2005

(65) Prior Publication Data

US 2007/0140631 A1   Jun. 21, 2007

(51) Int. Cl.
*G02B 6/44*   (2006.01)
(52) U.S. Cl. ............................ 385/113; 385/109
(58) Field of Classification Search ................ None
See application file for complete search history.

(56) References Cited

U.S. PATENT DOCUMENTS 4,844,575 A * 7/1989 Kinard et al. ............... 385/113
5,109,457 A   4/1992 Panuska et al.
6,101,305 A   8/2000 Wagman et al.
6,137,936 A   10/2000 Fitz et al.
6,377,738 B1  4/2002 Anderson et al.
2003/0044139 A1  3/2003 Norris et al.

FOREIGN PATENT DOCUMENTS

| EP | 0 405 851 A1 | 1/1991 |
| EP | 0 883 005 A1 | 12/1998 |
| WO | WO 01/84206 A2 | 11/2001 |

OTHER PUBLICATIONS

Griffioen, W. et al., "Versatile Optical Access Network for Business and Future Consumer Market," Communication Cables and Related Technologies, A.L. Harmer (Ed.) IOS Press, pp. 69-75, (1999).

* cited by examiner

*Primary Examiner*—Sung Pak
*Assistant Examiner*—Mike Stahl
(74) *Attorney, Agent, or Firm*—Finnegan, Henderson, Farabow, Garrett & Dunner, L.L.P.

(57) ABSTRACT

A telecommunication optical fiber cable and in particular a reduced diameter optical cable with improved installation features for use in the end part of an access telecommunication network. The optical fiber cable has a number of optical fibers; at least a core tube containing the optical fibers; a jacket surrounding the core tube; and at least one strength rod spaced from the central axis, the cable having a twisting stiffness $G*J_p$, wherein G is the elastic shear modulus; and $J_p$ is the polar moment of inertia of a cable section, wherein the twisting stiffness $G*J_p$ is lower than or equal to 0.10 Nm², preferably lower than or equal to 0.05 Nm², and more preferably lower than or equal to 0.02 Nm². The cable is profitably installable by a blown method.

22 Claims, 4 Drawing Sheets

DIELECTRIC OPTICAL FIBER CABLE HAVING IMPROVED INSTALLATION FEATURES

CROSS REFERENCE TO RELATED APPLICATION

This application is a national phase application based on PCT/EP2003/008268, filed Jul. 25, 2003, the content of which is incorporated herein by reference.

BACKGROUND OF THE INVENTION

1. Field of the Invention

The present invention relates to a telecommunication optical fiber cable and in particular it relates to a reduced diameter dielectric optical fiber cable with improved installation features for use in the end part of an access telecommunication network.

2. Description of the Related Art

Access telecommunication networks made by copper wires are being replaced by optical fiber networks in view of their large bandwidth capabilities. As the replacement is submitted to the effective final client requests and is rather expensive for a telecommunication provider, some providers use to arrange an access network made only of empty plastic conduits and to lay the optical fiber cables in the conduits only when proper requests from the clients have been received. Such access network optical cables could comprise a reduced number of optical fibers, typically 2÷12, 24, 48 or 72.

A suitable technique to install these optical cables in the conduits is the "blown method": the optical fibre cable is propelled along a previously installed duct by fluid drag of a gaseous medium, preferably air, blown along the duct in the desired direction of a cable advance. Blowing methods are deemed to be profitable for installing cables in long and short routes due to the lower cost, short time and low tension on the cable.

Advantageously, an optical cable which is able to be profitably installed in the above mentioned conduits by blowing methods should have a rather reduced diameter and a rather reduced weight. Such requirements are common to all the cables to be blowing installed but are much more important for those that are designed for the end access part of the network, that is characterized by a high number of direction changes (tortuous path).

The two well-known structures of optical cable are the multi-loose tube (MLT), wherein a plurality of tubes loosely house the optical fibers and are arranged around a central strength member, and the central-loose tube (CLT), wherein the fibers are loosely housed in a single central tube and the required strength of the cable is provided by other means, for example by two lateral rods.

MLT dielectric optical fiber cables comprising up to 24 optical fibers and fit for blowing installation in existing conduits are known in the art. Unfortunately, such multi loose tube optical cables, by their nature, are not easily miniaturized. For instance, MLT optical cables are known which comprise four tubes (with six optical fibers for each of them), with each tube having an outer diameter of 2.2 mm and an inner diameter of 1.5 mm, and having an outer diameter of about 6.3 mm. Other MLT optical cables are known which comprise six tubes (with four optical fibers for each of them), with each tube having an outer diameter of 1.9 mm and an inner diameter of 1.2 mm, and having an outer diameter of about 6.7 mm. The relatively large dimensions of such cable imposes the use of conduits of at least 10 mm of outer diameter.

CLT optical fiber cables suitable for blown installation are described, for example, in the article of W. Griffioen et al., "Versatile Optical Access Network for Business and Future Consumer Market", Communication Cables and Related Technologies, A. L. Harmer (Ed.) IOS Press., 1999, pp. 69-75. Such cables comprise a steel welded tube which is covered by a HDPE (High Density Polyethylene) based mixture. These cables may have an outer diameter of about 4 mm (those comprising 2÷12 fibers) or about 6 mm (those comprising 24÷48 fibers) so that they require to be installed in conduits (typically made of plastic) having inner and outer diameters of 7 mm and 10 mm, respectively. It is also observed that the above CLT cables are not dielectric and such a requirement is generally a key one for the local access networks that are high sensitive to electromagnetic fields and phenomena.

In view of the above, there is the need of an optical cable comprising a rather low number of optical fibers, typically up to 24 optical fibers, which is dielectric, which is usable in a wide range of temperatures, (typically from about −30° C. to about +60° C., for outdoor applications, and from about −10° C. to about +60° C. for indoor applications) which is installable by blowing techniques in a tube of relative reduced dimensions (typically having outer diameter of about 7 mm and an inner diameter of about 5.5 mm) and finally which has a rather reduced diameter, typically about 4.0÷4.5 mm.

The Applicant has considered that a CLT cable structure is particularly suitable to achieve these goals. In other words, a profitable optical cable structure providing dielectric, temperature resistance and reduced size features is the one comprising: a core tube containing optical fibers, a plastic jacket that surrounds the core tube, and a pair of linearly extending, diametrically opposed dielectric rods that are at least partially embedded in the jacket, with the rods having a compressive stiffness that is effective to inhibit substantial contraction of the cable and a tensile stiffness that is effective to receive a tensile load without substantial transfer of the tensile load to the optical fibers. The rods provide both tensile and compressive modulus and strength so that their compressive properties are sufficient to inhibit shrinkage of the plastic jacket and to resist buckling during handling of the cable.

The above described type of cable with the core tube and a pair of dielectric reinforcing rods simmetrically positioned on opposite sides of the core tube is characterized by an asymmetric bending behavior. In particular, a cable of the above type exhibits a bending stiffness in the plane containing the two reinforcing rods that is higher than the bending stiffness in the plane which is orthogonal to the plane passing through the reinforcing rods. In other words, a similar cable exhibits preferential bending plane. It is known to the man skilled in the art that the cables based on such a structure may have reduced performances in terms of maximum cable lengths that can be introduced in a tube, the installation performances being even lower when blowing techniques are used.

US 2003/0044139, which is considered the closest prior art, describes a known CLT optical cable which is reinforced by a pair of diametrically opposed strength rods. According to US 2003/0044139, the bending resistance between orthogonal bending planes can differ by a factor of only 1.2 if the rods are surrounded by a frictional adhesion coating that enables them to move locally within the jacket in response to compressive or flexural stress applied to the cable, while without that coating the same factor would be four. According to the teachings of US 2003/0044139, this increases the blowing performances of the cable. The cable described in US 2003/0044139 is a cable containing a relatively large number of optical fibers and has a rather large diameter reinforcing rods (1.5÷3.0 mm). It is therefore likely that said cable has a relatively high diameter and is designed for application in the backbone of a telecommunication network, which is not so tortuous as the path in the final/access part of the network itself.

SUMMARY OF THE INVENTION

In view of the above considerations, one object of the present invention is providing a dielectric telecommunication optical fiber cable, and in particular a reduced diameter optical fiber cable, with improved installation features and particularly suitable for use in the end part of an access telecommunication network or the like.

A further object of the present invention is providing an improved installation dielectric telecommunication optical fiber cable which can be profitably installed by blowing techniques.

The Applicant has carried out some tests and has observed that the optical cables having the above-mentioned CLT structure (comprising a core tube and two diametrically opposed reinforcing dielectric rods) have an attitude, when blown in a duct, to bend always in the plane where the bending resistance is lower and the lowest bending deformation energy is correspondingly required. Thus, typically, the bending takes place in the lowest bending deformation energy plane and the bending properties in the plane that is orthogonal to the lowest energy one does not fundamentally affect the bending behavior of the cable.

The Applicant has also observed that this behaviour depends on both the cable structure and the tortuosity of the path, and that under certain conditions, the cable could be unable to suitably orientate according to its lowest bending deformation energy plane.

According to the present invention, the improved installation features of an optical cable are obtained by providing an optical fiber cable wherein the twisting energy is reduced with respect to similar cables so that the cable is able to twist along the path for suitably orientating its lowest energy plane also in particularly tortuous paths. Thus, the present invention, differently from the closest prior art, obtains the improved installation feature not by acting on the ratio between the bending resistance in two orthogonal planes but by reducing the twisting energy of the cable.

In other words, the Applicant has found that a CLT cable having a reinforcing system comprising at least one strength member misaligned with the cable central axis, but preferably two or more lateral strength rods, can be particularly suitable for blown installation in a tortuous path, such that in the final part of an access telecommunication network, by reducing as much as possible its twisting stiffness. The Applicant has verified that a cable having a maximum twisting stiffness of about 0.10 $Nm^2$, preferably of about 0.05 $Nm^2$, more preferably of about 0.02 $Nm^2$, satisfies the above requirements.

The Applicant has also verified that the twisting stiffness of the cable can be reduced to such a low values by reducing, in combination or in alternative, the strength rods diameter and the strength rods mutual distance.

It can be appreciated that, also for cables having relatively high bending stiffness in the preferential bending plane, with consequent poor installation performances, a reduction of the twisting stiffness improves anyway its blowability into installation conduits, due to a reduction of the total work spent for advancing it.

According to a first aspect, the present invention relates to an optical fiber cable having a central axis and comprising:
a number of optical fibers;
at least a core tube containing the optical fibers;
a jacket surrounding the core tube; and
at least one strength rod spaced from the central axis,
the cable having a twisting stiffness $G*J_p$, wherein G is the elastic shear modulus; and $J_p$ is the polar moment of inertia of a cable section, the twisting stiffness $G*J_p$ being lower than, or equal to, 0.10 $Nm^2$.

Preferably, the optical cable comprises at least two linearly extending, diametrically opposed, strength rods that are at least partially embedded in the jacket.

Preferably, the twisting stiffness is lower than, or equal to, 0.05 $Nm^2$, more preferably is lower than, or equal to, 0.02 $Nm^2$.

Preferably, the polar inertia momentum given by the reinforcing rods is lower than, or equal to, $20 \cdot 10^{-12}$ $m^4$, more preferably is lower than, or equal to, $10 \cdot 10^{-12}$ $m^4$.

Preferably, when the cable is guided on a path formed by two bends spaced of 0.5 m, arranged on orthogonal planes and having a bend radius according to the minimum dynamic bending radius prescribed for the cable, the ratio between the bending work for bending the optical fiber cable around the two bends and the twisting work for twisting the cable between the two bends is higher than 30, preferably higher than 50, more preferably higher than 80 and still more preferably higher than 90. The distance of 0.5 m is significant in that it represents a particularly severe situation in a blown installation.

Preferably, the bending stiffness of the cable structure in the lower bending plane is between about 0.01 $Nm^2$ and 0.10 $Nm^2$, more preferably between about 0.01 $Nm^2$ and 0.06 $Nm^2$.

Preferably, the reciprocal distance of the axes of the strength longitudinal rods is between about 1.5 mm and 5.0 mm, more preferably between about 2.0 mm and 4.0 mm.

Preferably, the strength longitudinal rods have a diameter lower than, or equal to, about 1 mm, more preferably between about 0.4 mm and 0.7 mm.

Preferably, the jacket has an outer diameter from about 3.0 mm to about 6.0 mm, more preferably from about 4.0 mm to 5.0 mm and still more preferably from about 4.0 to 4.5 mm.

Preferably, the strength longitudinal rods comprise Glass-Reinforced Plastic or Aramid-Reinforced Plastic.

Preferably, the strength longitudinal rods comprise filamentary strands of glass and/or aramid fibers.

BRIEF DESCRIPTION OF THE DRAWING

The present invention will become fully clear after reading the following detailed description and having reference to the attached drawings, wherein.

DETAILED DESCRIPTION OF THE INVENTION

Figures 1, 2:
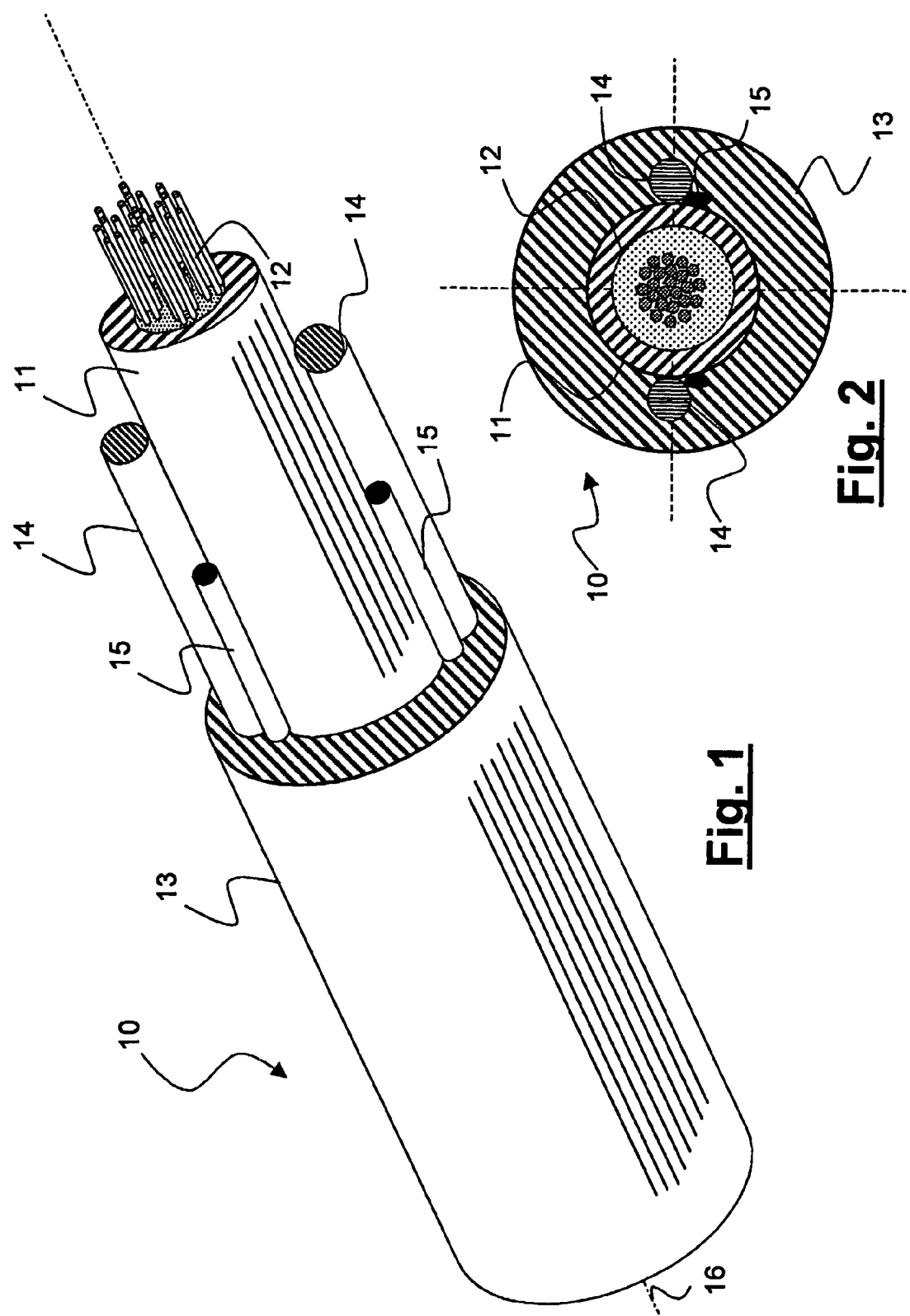
FIG. 1 is a perspective view of a cable according to the present invention.
FIG. 2 is a cross section view of the cable according to the present invention.

With reference to FIGS. 1 and 2, the dielectric optical fiber cable 10 according to the present invention comprises: at least a core tube 11 containing optical fibers 12, a plastic jacket 13 that surrounds the core tube 11, and a pair of linearly extending, diametrically opposed dielectric rods 14 that are at least partially embedded in the jacket 13, with the rods 14 having a compressive stiffness that is effective to inhibit substantial contraction of the cable and a tensile stiffness that is effective to receive a tensile load without substantial transfer of the tensile load to the optical fibers 12. Possibly, the cable according to the present invention further comprises jacket cutting elements 15 for cutting the jacket 13 at the cable extremities in order to easily access the fibers. The cable 10 has a longitudinal axis 16.

Preferably, the rods comprise filamentary strands of glass and/or aramid fibers, more preferably they are made of GRP (Glass-Reinforced Plastic) or ARP (Aramid-Reinforced Plastic). Moreover, the rods are preferably positioned tangent to the outer surface of core tube 11.

Typically, a cable according to the present invention comprises up to 24 optical fibers 12. The optical fibers may lay straight or SZ inside the tube 11 and are preferably grouped in a bundle, for example with three central fibers and other nine around the central three, and the remaining in the external part. The space between the fibers and the tube 11 is preferably filled with a jelly.

Figure 3:
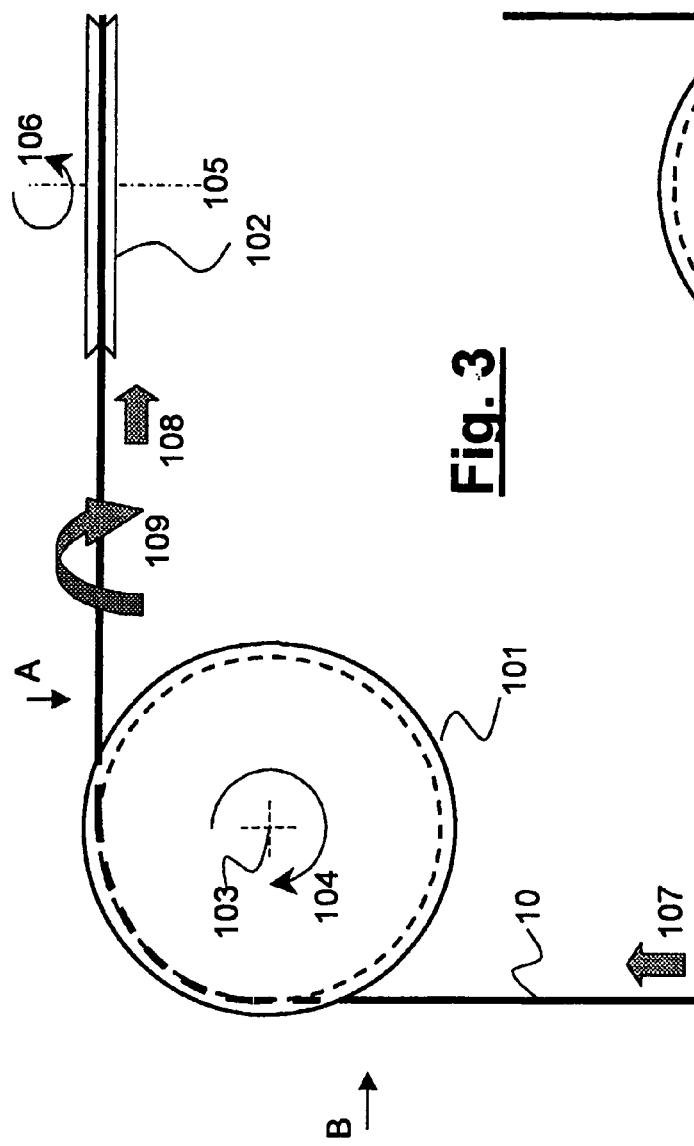
FIG. 3 is a diagrammatic plant view of a test arrangement that has been used for testing the cable of the invention.
Figure 4A:
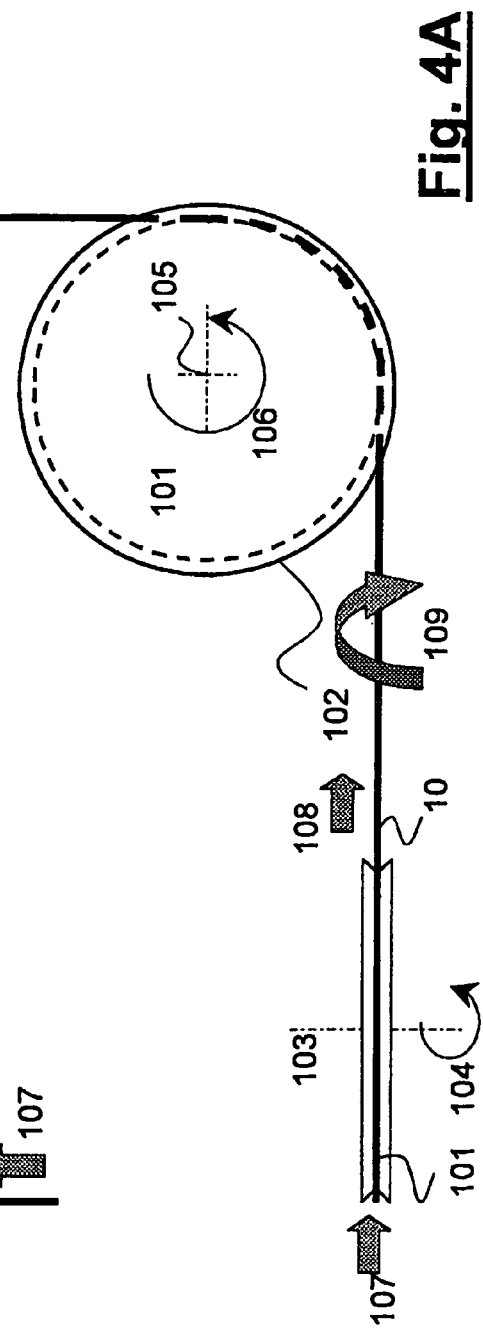
FIG. 4A diagrammatically shows the same test arrangement of FIG. 3 as seen from A.
Figure 4B:
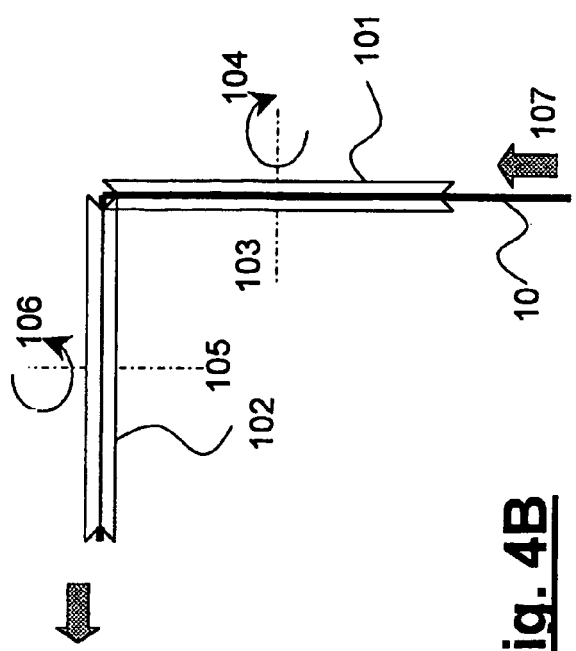
FIG. 4B diagrammatically shows the same test arrangement of FIG. 3 as seen from B.

In order to understand the behavior of an optical cable of the above type when it is installed by blowing techniques in the access part of a telecommunication network, that is characterized by a highly tortuous path, the Applicant has simulated a typical path length by an arrangement which is shown in FIGS. 3, 4A, and 4B. The arrangement 100 comprises two pulleys 101 and 102 at a certain distance L one from each other. The first pulley 101 is rotatably mounted around an axis 103. The rotation direction is indicated by 104. The second pulley 102 is rotatably mounted around an axis 105 that is orthogonal with respect to axis 103. The rotation direction of pulley 102 is indicated by 106.

An optical fiber cable 10 was wound around the first pulley (see arrow 107), directed through the second pulley 102 (see arrow 108) and wound around it. It has been observed by the Applicant that the cable 10, being of the type illustrated in FIGS. 1 and 2, has an attitude to always bend in a plane where the bending resistance is lower and the lowest bending deformation energy is correspondingly required. Thus, in the pulley arrangement of FIGS. 3 and 4, the cable tends to twist about its axis 16 in the path between the two pulleys so as to be able to wind on both the pulleys 101 and 102 according to the lower bending resistance plane.

The above behavior depends on the twisting stiffness of the cable structure and, in particular, on the mechanical work which is necessary in order to have the cable rotated about its own axis along a cable length between two consecutive pulleys. Thus, the optical fiber cable must have a reduced total deformation work, namely requesting a low energy to twist, so that it can be installed into a highly tortuous path.

As an optical cable is considered fundamentally unelastic, the whole work of deformation which an optical cable is subject to when it pass through two pulleys as illustrated in FIGS. 3, 4A and 4B and is given by at least the following three main terms:

A: work for bending (and straightening afterwards) the optical cable around the first pulley;

B: work for twisting the optical cable in the span between the two pulleys; and

C: work for bending (and straightening afterwards) the optical cable around the second pulley.

Term A is given by $L_{F1}=M_{F1}/R_1$ wherein $M_{F1}=(E^*J_m)/R_1$ is the associated bending moment.

Term B is given by $L_T=(1/2)^*(\phi/l)^*M_T$ wherein $M_T=(\phi/l)^*(G^*J_p)$ is the associated twisting moment.

Finally, term C is given by $L_{F2}=M_{F2}/R_2$ wherein $M_{F2}=(E^*J_m)/R_2$ is the associated bending moment.

All the work terms are calculated for a length of 1 m of deformed cable.

Wherein:

($E^*J_m$): Bending stiffness of a cable in the plane where energy is lower;

E: Coefficient of elasticity;

$J_m$: Moment of inertia of a cable section in the plane where energy is lower;

$R_1$, $R_2$: Curvature radius of the first and second pulleys;

($\phi/l$): Specific twisting of the cable per length unity;

($G^*J_p$): Twisting stiffness of the cable;

G: Total elastic shear modulus; and $J_p$: Polar moment of inertia of the cable section.

Figure 5:
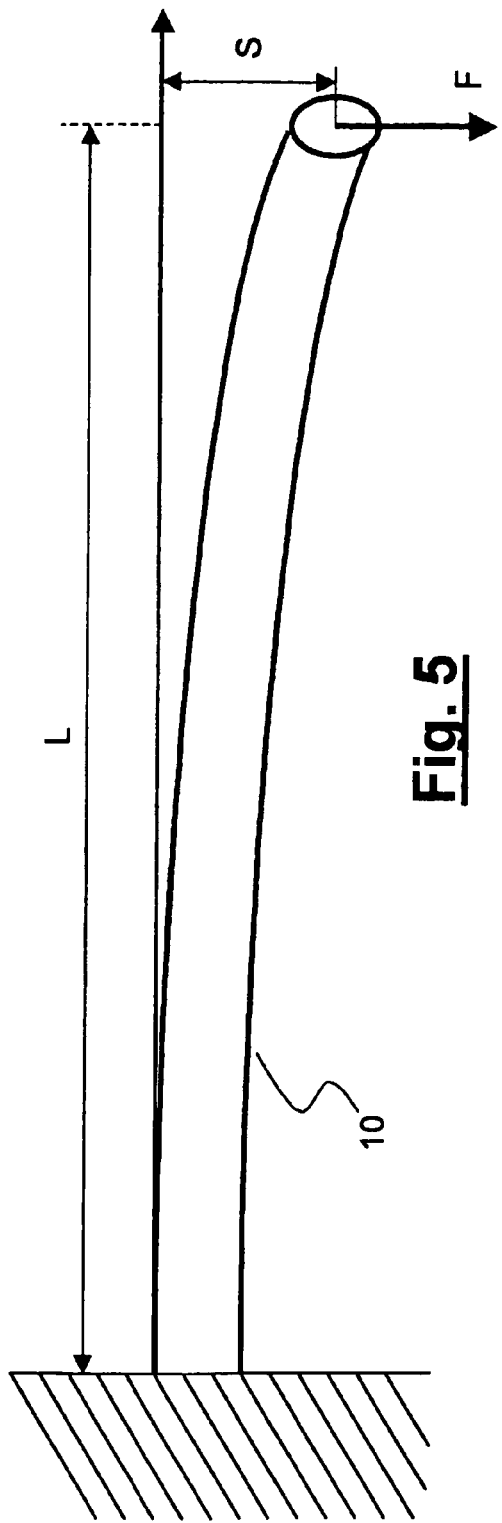
FIG. 5 diagrammatically shows how to measure a cable bending stiffness.

The bending stiffness is calculated through the method E17B which is set forth by IEC 60794-1-2/1999 (FIG. 5 diagrammatically shows a cantilever test set-up apparatus): $(E^*J_m)=F^*L^3/(3^*S)$, wherein F is the applied force; S is the cable deflection; and L is the cable length that is subject to bending moment.

According to method E17B, a cable sample is secured in a clamp, a force is applied to the end of the sample remote from the clamp and the subsequent displacement is measured. The sample should be prepared to prevent any movement of the cable components at the extremities that can affect the result.

The twisting stiffness is given by: $(G^*J_p)=M_1/(\theta/L)$, wherein $M_1=F^*l$ is the twisting moment that is applied; and ($\theta/L$) is the specific twisting of the cable structure.

Figure 6:
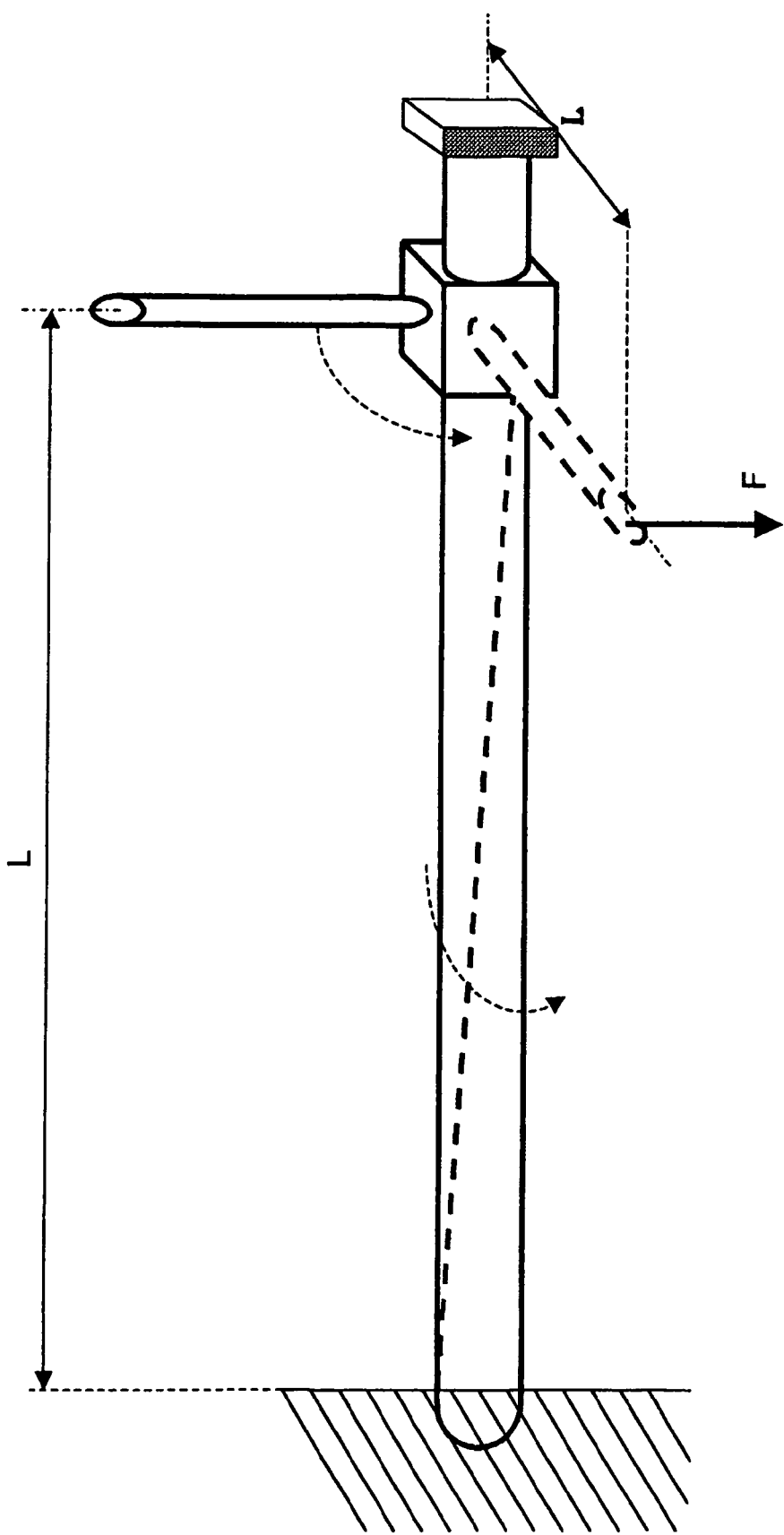
FIG. 6 diagrammatically shows how to measure a cable twisting stiffness.

FIG. 6 diagrammatically shows a possible twisting test set-up apparatus. A cable sample is secured in a first clamp at one extremity (left side in FIG. 6) and in a second clamp at the opposite extremity, to prevent relative movements of the cable components at the extremities that can affect the result. At a distance L from the first clamp a twisting lever is arranged (having a length l). In FIG. 6 a 90° twist is perfomed and the corresponding movement of a reference line is measured.

The above explanation makes it clear that the whole deformation work depends on the bending and twisting moments and thus on the bending and twisting stiffnesses.

The Applicant, therefore, has reached the conclusion that installation of the above mentioned asymmetric CLT cables requires, with respect to a symmetrical cable (such as a MLT cable), an additional mechanical work that is necessary in order to have the cable twisted and properly oriented. "Properly oriented" means that the cable arranges itself in a preferred position with respect to the bending plane imposed by the installation path, in particular with its lowest bending deformation plane parallel to the bending plane. The bending plane is considered the plane containing the straight trajectories before and after the bend and the curve comprised therebetween.

The additional mechanical work depends on various factors, including: physical structure of the cable (namely, physical characteristics of the components, size of the cable and, in particular, arrangement and reciprocal distance of the two reinforcing rods); amount of the rotation angle of the cable for adapting itself to the change of bending plane due to the local installation path; and distance between two consecutive bends oriented in different bending planes (in the apparatus that has been used, the distance L between the two pulleys).

According to some tests made by the Applicant, it has been discovered that a reduced-size optical fiber cable having a high ratio between the bending deformation work and the twisting deformation work ($L_f/L_1$) is able, also when blown in very tortuous conduits, to twist between two consecutive bends of the conduit so as to always have its minimum energy bending plane oriented parallel to the bending plane imposed by the path.

The Applicant has in particular found that a CLT optical cable having two lateral rods is suitable to be blown into particularly tortuous paths if the ratio ($L_f/L_1$) is higher than about 30, preferably higher than about 50, more preferably higher than about 80, still more preferably higher than about 90. These values have in particular been determined considering the particular severe condition of a path including bends spaced of 0.5 m and having the respective bend planes inclined of 90° from each other.

The ratio ($L_f/L_1$) is given by the following formula:

$$(L_f/L_1) = (M_f/M_1)*(1/R)*k_1 = [(E*J)/(G*J_p)]*(1/R^2)*k_2 \quad (1)$$

wherein:
$L_f$: bending work (for bending/straightening a cable on two bending planes that are arranged orthogonal one to each other);
$L_1$: twisting work (for twisting a cable by 90° between two bends on orthogonal bending planes);
$M_f$: lower bending moment (for bending and straightening a cable in two bending planes that are offset by 90°, with a curvature radius R);
$M_1$: twisting moment (for twisting a cable by 90° along a length of 0.5 m)
(E*J): lower bending stiffness of the cable structure;
(G*Jp): twisting stiffness of the cable structure;
$k_1, k_2$: constants that are dependent on the side conditions; and
R: minimum curvature radius that can be imposed to the cable in dynamic conditions without risks of structural damages (generally, R=n*D where D is the cable diameter and n is an experimental/empirical factor).
$k_1 = 4/(\phi/l)$ and $k_2 = 4/(\phi/l)^2$ From the above formula (1), it results that ($L_f/L_1$) is inversely proportional to $R^2$ and to (G*Jp).

As far as R is concerned, it is observed that the lower is R, the higher is the bending work for bending the cable with respect to the twisting work.

As results from formula (1), the ratio ($L_f/L_1$) is related to the twisting stiffness (G*Jp) of the cable. The Applicant has found that, if the twisting stiffness (G*Jp) is lower than about 0.10 Nm², the desired relation between $L_f$ and $L_1$ can be satisfied. Better performances can be obtained if (G*Jp) is lower than about 0.05 Nm² and still better performances can be obtained if (G*Jp) is lower than about 0.02 Nm².

In practice, the term (G*Jp) has several contributions from the different parts of the cable, such as the core tube 11, the jacket 13 and the rods 14, so that it can be expressed as $$(G*Jp) = \Sigma_i (G_i * J_{p,i}),$$

where the elastic shear modulus $G_i$ of the single component $i_i$ can in turn be expressed as:

$$G_i = E \cdot \left[ \frac{1}{2(1 + 1/m_i)} \right]$$

where $1/m_i = v_i$ is the Poisson coefficient.

In practice, the twisting stiffness (G*Jp) strongly depends on the two reinforcing rods that are at least partially embedded in the cable jacket.

The elastic shear modulus G is related to the particular materials used in the cable. As concerns the rods, both GRP and ARP have a value of G lower than metal and are therefore preferred for the considered application.

The polar inertia momentum of the rods is given by the following formula (2).

$$J_{p,r} = 2 * \{[(\pi r^4)/2] + [(\pi r^2)*y^2]\} \quad (2)$$

Wherein:
$J_{p,r}$: polar inertia momentum given by the two reinforcing rods;
r: radius of each of the reinforcing rods; and
y: distance between the cable axis and the reinforcing rod axis.

It results that the cable twisting stiffness, and thus the corresponding momentum and work, are low when the two bars are close to cable axis and when the bars have a reduced diameter.

The Applicant has found that the polar inertia momentum $J_{p,r}$ should be preferably lower than about $20 \cdot 10^{-12}$ m⁴, more preferably lower than $10 \cdot 10^{-12}$ m⁴.

In order to provide a high blowing capability, both the bending deformation work and the twisting deformation work should be minimized. The bending deformation work can be minimized by reducing the whole cable diameter and the twisting deformation work can be minimized by reducing the diameter and/or the distance of the reinforcing rods.

According to the results obtained through tests made by the Applicant and performed in conduits with lengths up to 500 m, the Applicant has found that the optical fiber cable 10 comprising a number of optical fibers of up to 24 should preferably have, in addition to a twisting stiffness in the above-mentioned range, the following characteristics:
diameter of the cable: from about 3.0 mm to 6.0 mm, preferably from about 4.0 mm to 5.0 mm and more preferably from about 4.0 mm to 4.5 mm;
distance from the axes of the reinforcing longitudinal rods: between about 1.5 mm and 5.0 mm, preferably between about 2.0 and 4.0 mm;
diameter of rods preferably $\leq$ about 1 mm, more preferably between about 0.4 and 0.7 mm;
bending stiffness of the cable structure in the plane where the bending is lower: between about 0.01 Nm² and 0.10 Nm², preferably between about 0.01 Nm² and 0.06 Nm².

Herebelow some test results are given in detail.

Test 1

Test 1 was conducted with a dielectric optical fiber cable comprising a core tube containing 24 optical fibers, a plastic jacket that surrounds the core tube, and a pair of linearly extending, diametrically opposed GRP (Glass-Reinforcing plastic) rods that were embedded in the jacket and tangent to the core tube. The cable whole diameter was 4.1 mm; the jacket was made of HDPE (High-Density Poly-Ethylene); each rod of the pair of rods had a diameter of 0.40 mm; and the core tube was in PBT with an outer diameter ($D_e$)=about 2.60 mm and an inner diameter ($D_i$)=about 1.95 mm. The distance axis-to-axis of the rods was 3 mm. The polar inertia momentum $J_{p,r}$ of the two-rods reinforcing system was $0.570 \cdot 10^{-12}$ m$^4$.

A similar cable was subject to mechanical measurements for both the bending and twisting stiffness and the following results were obtained.

bending stiffness ($E^*J_m$) measured in the plane requesting the lower bending energy: about 0.0155 Nm$^2$;

bending stiffness ($E^*J_M$) measured in the plane orthogonal to the one requesting the lower bending energy: about 0.0330 Nm$^2$;

twisting stiffness ($G^*J_p$): about 0.0053 Nm$^2$;

($E^*J_m$)/($E^*J_M$): about 2.13.

The above experimental data have been used for simulating and 10 estimating the behavior of the cable in terms of momentum and corresponding deformation work when the cable is subject, during the installation step into a tortuous tube, to two successive bendings on different bending planes.

The following conditions have been considered:

minimum bending radius for the cable in dynamic conditions: R=0.120 m (R=about 30 times the cable diameter);

rotation angle of the bending plane: $\phi$=90° and distance L (see FIG. 6): about 0.50 m, about 1.0 m, about 1.5 m, and about 2.0 m.

The total deformation work required by the cable was calculated and indicated, together with the above and other values, in the below table 1, wherein the work is referred to a length of 1 m of deformed cable:

The elastic shear modulus $G_r$ of the GPR rods has been measured using the method explained with reference to FIG. 6 and the relation $$G_r = \frac{M_t}{(\varphi/L) \cdot J_{p,r}}$$

where Mt=F·l (F being the force applied and l the arm) and ($\phi$/L) is the twist of the cable per unit length. The measured $G_r$ was $5.9 \cdot 10^9$ N/m$^2$.

The teoric twisting stiffness $G_r^*J_{p,r}$ of the two-rods system has been calculated. In test 1, $G_r^*J_{p,r}$ was 0.00336 Nm$^2$ which is very close to the whole cable twisting stiffness.

An optical cable according to the above characteristics was then installed in a real conduct of the end part of an access network. The Applicant has verified that a similar cable experienced good performances when installed in highly tortuous conducts having an inner diameter of both about 5.5 mm and 8.0 mm.

Test 2

Test 2 was conducted with a dielectric optical fiber cable comprising a core tube containing up to 24 optical fibers, a plastic jacket that surrounds the core tube, and a pair of linearly extending, diametrically opposed GRP rods that were embedded in the jacket and tangent to the core tube. The cable whole diameter was 5.0 mm; the jacket was made of HDPE; each rod of the pair of rods had a diameter of 0.70 mm; and the core tube was in PBT with an outer diameter ($D_e$)=about 2.80 mm and an inner diameter ($D_i$)=about 2.00 mm. The distance axis-to-axis of the rods was 3.5 mm. The polar inertia momentum $J_{p,r}$ of the two-rods reinforcing system was $2.404 \cdot 10^{-12}$ m$^4$.

A similar cable was subject to mechanical measurements for both the bending and twisting stiffness and the following results were obtained.

TABLE 1

Cable $\Phi$ = 4.1 mm

| Bending stiffness ($E \cdot J_m$) [Nm$^2$] | Bending Momentum (1$^{st}$ and 2$^{nd}$ bends) $M_f = (E \cdot J_m)/R$ [Nm] | Total bending work $L_f = 2 \cdot (M_f/R)$ [(Nm)/m] | Twisting stiffness ($G \cdot J_p$) [Nm$^2$] | L [m] | Twisting momentum $M_t = (\phi/l)(G \cdot J_p)$ [Nm] | Twisting work $L_t = (½)(\phi/l)M_t$ [(Nm)/m] | Total deform. work $L_{tot} = L_f + L_t$ [(Nm)/m] |
|---|---|---|---|---|---|---|---|
| 0.0155 | 0.1292 | 2.1533 | 0.0053 | 0.5 | 0.0167 | 0.0262 | 2.1795 |
| | | | | 1.0 | 0.0083 | 0.0065 | 2.1598 |
| | | | | 1.5 | 0.0056 | 0.0029 | 2.1562 |
| | | | | 2.0 | 0.0042 | 0.0016 | 2.1549 |

Briefly, in order to bend a cable according to two bends with a radius of 120 mm, placed on two orthogonal bending planes at a distance of 0.5 m one from each other it is necessary to spend, for each meter of advancing cable, a total deformation work of about 2.18 N·m (with about 0.03 being the additional twisting work).

From the above it is also noticed that ($L_f/L_t$) ranges from about 82 (when L=0.5 m) to 1345 (when L=2 m).

With the cable according to the present invention, even under almost "extreme" conditions (L=0.5 m), the total deformation work $L_{tot}$ is rather low (about 2.18 Nm) and the contribution due to twisting is almost negligible (about +0.03 Nm).

bending stiffness ($E^*J_m$) measured in the plane requesting the lower bending energy: about 0.041 Nm$^2$;

bending stiffness ($E^*J_M$) measured in the plane orthogonal to the one requesting the lower bending energy: about 0.108 Nm$^2$;

twisting stiffness ($G^*J_p$): about 0.0137 Nm$^2$;

($E^*J_m$)/($E^*J_M$): about 2.63.

The above experimental data have been used for simulating and estimating the behavior of the cable in terms of momentum and corresponding deformation work when the cable is subject, during the installation step into a tortuous tube, to two successive bendings on different bending planes.

The following conditions were considered:
bending radius for the cable in dynamic conditions: R=0.125 m (R=about 25 times the cable diameter);
rotation angle of the bending plane: φ=90° and
distance L (see FIG. 6): about 0.50 m, about 1.0 m, about 1.5 m, and about 2.0 m.

The total deformation work required by the cable has been calculated and indicated, together with the above and other values, in the below table 2, wherein the work is referred to a length of 1 m of deformed cable:

TABLE 2

| | | | | Cable Φ = 5.0 mm | | | |
|---|---|---|---|---|---|---|---|
| Bending stiffness $(E \cdot J_m)$ [Nm$^2$] | Bending Momentum (1$^{st}$ and 2$^{nd}$ bends) $M_f = (E \cdot J_m)/R$ [Nm] | Total bending work $L_f = 2 \cdot (M_f/R)$ [(Nm)/m] | Twisting stiffness $(G \cdot J_p)$ [Nm$^2$] | L [m] | Twisting momentum $M_t = (\phi/l)(G \cdot J_p)$ [Nm] | Twisting work $L_t = (½)(\phi/l)M_t$ [(Nm)/m] | Total deform. work $L_{tot} = L_f + L_t$ [(Nm)/m] |
| 0.041 | 0.328 | 5.248 | 0.0137 | 0.5 | 0.0430 | 0.0675 | 5.316 |
| | | | | 1.0 | 0.0215 | 0.0169 | 5.265 |
| | | | | 1.5 | 0.0143 | 0.0075 | 5.255 |
| | | | | 2.0 | 0.0108 | 0.0042 | 5.252 |

Briefly, in order to bend a cable according to two bends with a radius of 125 mm, placed on two orthogonal bending planes at a distance of 0.5 m one from each other it is necessary to spend, for each meter of advancing cable, a total deformation work of about 5.32 N·m (with about 0.07 being the additional twisting work).

From the above it was also noticed that ($L_f/L_t$) ranges from about 77 (when L=0.5 m) to 11250 (when L=2 m).

With the cable according to the present invention, even under almost "extreme" conditions (L=0.5 m), the total deformation work $L_{tot}$ was rather low (about 5.316 Nm) and the contribution due to twisting was almost negligible (about +0.07 Nm).

The elastic shear modulus of GPR rods is (as explained in Test 1) 5.9·10$^9$ N/m$^2$.

The teoric twisting stiffness $G^*J_{p,r}$ has then been calculated. In test 2, $G^*J_{p,r}$ was 0.01419 Nm$^2$ which is very close to the whole cable twisting stiffness.

An optical cable according to the above characteristics was finally installed in a real conduct of the end part of an access network. The Applicant has verified that a similar cable experienced good performances when it is installed in highly tortuous conducts having a diameter of about 8.0 mm.

Test 3

Test 3 was conducted with a dielectric optical fiber cable comprising a core tube containing a number of optical fibers, a plastic jacket that surrounds the core tube, and a pair of linearly extending, diametrically opposed GRP rods that are at least partially embedded in the jacket and tangent to the core tube. The cable whole diameter was 13.2 mm; the jacket was made of HDPE; each rod of the pair of rods had a diameter of 1.60 mm; and the core tube was in MDPE with an outer diameter $(D_e)$=about 8.40 mm and an inner diameter $(D_i)$=about 6.40 mm. The distance axis-to-axis of the rods was 10 mm. The polar inertia momentum $J_{p,r}$ of the two-rods reinforcing system was 101.8·10$^{-12}$ m$^4$.

A similar cable was subject to mechanical measurements for both the bending and twisting stiffness and the following results were obtained.

bending stiffness $(E^*J_m)$ measured in the plane requesting the lower bending energy: about 1.71 Nm$^2$;

bending stiffness $(E^*J_M)$ measured in the plane orthogonal to the one requesting the lower bending energy: about 5.74 Nm$^2$;

twisting stiffness $(G^*J_p)$: about 0.51 Nm$^2$;

$(E^*J_m)/(E^*J_M)$: about 3.36.

The above experimental data were used for simulating and estimating the behavior of the cable in terms of momentum and corresponding deformation work when the cable is subject, during the installation step into a tortuous tube, to two successive bendings on different bending planes.

The following conditions were considered:
bending radius for the cable in dynamic conditions: R=0.270 m (R=about 20 times the cable diameter);
rotation angle of the bending plane: φ=90°; and
distance L (see FIG. 6): about 0.50 m, about 1.0 m, about 1.5 m, and about 2.0 m.

The total deformation work required by the cable was calculated and indicated, together with the above and other values, in the below table 3, wherein the work is referred to a length of 1 m of deformed cable:

TABLE 3

| | | | | Cable Φ = 13.2 mm | | | |
|---|---|---|---|---|---|---|---|
| Bending stiffness $(E \cdot J_m)$ [Nm$^2$] | Bending Momentum (1$^{st}$ and 2$^{nd}$ bends) $M_f = (E \cdot J_m)/R$ [Nm] | Total bending work $L_f = 2 \cdot (M_f/R)$ [(Nm)/m] | Twisting stiffness $(G \cdot J_p)$ [Nm$^2$] | L [m] | Twisting momentum $M_t = (\phi/l)(G \cdot J_p)$ [Nm] | Twisting work $L_t = (½)(\phi/l)M_t$ [(Nm)/m] | Total deform. work $L_{tot} = L_f + L_t$ [(Nm)/m] |
| 1.71 | 6.33 | 46.89 | 0.51 | 0.5 | 1.60 | 2.51 | 49.4 |
| | | | | 1.0 | 0.80 | 0.63 | 47.5 |
| | | | | 1.5 | 0.53 | 0.26 | 47.3 |
| | | | | 2.0 | 0.40 | 0.16 | 47.1 |

Briefly, in order to bend a cable according to two bends with a radius of 270 mm, placed on two orthogonal bending planes at a distance of 0.5 m one from each other it was necessary to spend, for each meter of advancing cable, a total deformation work of about 49.4 N·m (with about 2.51 being the additional twisting work).

From the above it is also noticed that ($L_{fLt}$) ranges from about 19 (when L=0.5 m) to 293 (when L=2 m).

In this large size cable, the total deformation work $L_{tot}$ is rather high (about 49.4 N·m) and the contribution due to twisting is not negligible (about +2.51 Nm).

The elastic shear modulus $G_r$ of the GPR rods is (as explained in test 1) $5.9 \cdot 10^9$ N/m$^2$.

The teoric twisting stiffness $G_r * J_{p,r}$ has then been calculated. In test 3, $G_r * J_{p,r}$ was 0.60072 Nm$^2$ which is very close to the whole cable twisting stiffness.

An optical cable according to the above characteristics was installed in a real conduct of the end part of an access network. The Applicant has verified that a similar cable experienced rather bad performances when it was installed in highly tortuous conduits.

There has thus been shown and described a novel telecommunication optical cable which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the scope of the invention are deemed to be covered by the invention which is limited only by the claims which follow.

For example, although the above description refers to a dielectric optical cable, the present invention can be applied as well to a cable provided with metallic strength rods.

Moreover, although the present invention has been described with reference to a cable including two strength rods, it can be appreciated that the invention can be applied to any cable having a different number of strength rods, provided that the cable has an asymmetric structure and, in particular, a preferential bending plane.

The cable could for example comprise a single strength rod such as described in U.S. Pat. No. 6,137,936, or may have on each side a number of rods greater than two, preferably adjacent to each other.

Although the rods are preferably positioned tangent to the core tube and at least partially embedded in the jacket, in a different embodiment the rods may be at least partially embedded in the core tube, such as described in U.S. Pat. No. 6,377,738.

The invention claimed is:

1. An optical fiber cable, having a central axis and comprising:
    a number of optical fibers;
    at least a core tube containing the optical fibers;
    a jacket surrounding the core tube; and
    at least one strength rod spaced from the central axis, the cable having a twisting stiffness $G*J_p$, wherein G is the elastic shear modulus; and $J_p$ is the polar moment of inertia of a cable section, the twisting stiffness $G*J_p$, being lower than or equal to 0.10 Nm$^2$.

2. The optical cable according to claim 1, comprising at least two linearly extending, diametrically opposed, strength rods that are at least partially embedded in the jacket.

3. The optical cable according to claim 1, wherein the twisting stiffness $G*J_p$, is lower than or equal to 0.05 Nm$^2$.

4. The optical cable according to claim 1, wherein the twisting stiffness $G*J_p$, is lower than or equal to 0.02 Nm$^2$.

5. The optical cable according to claim 2, wherein the polar inertia momentum $J_{p,r}$ given by the strength rods is lower than or equal to $20 \cdot 10^{-12}$ m$^4$.

6. The optical cable according to claim 2, wherein the polar inertia momentum $J_{p,r}$ given by the strength rods is lower than or equal to $10 \cdot 10^{-12}$ m$^4$.

7. The optical cable according to claim 1, wherein when the cable is guided on a path formed by two bends spaced at 0.5 m arranged on orthogonal planes and having a bend radius according to the minimum dynamic bending radius prescribed for the cable, the ratio between the bending work for bending the optical fiber cable around the two bends and the twisting work for twisting the cable between the two bends is higher than 30.

8. The optical cable according to claim 1, wherein when the cable is guided on a path formed by two bends spaced at 0.5 in arranged on orthogonal planes and having a bend radius according to the minimum dynamic bending radius prescribed for the cable, the ratio between the bending work for bending the optical fiber cable around the two bends and the twisting work for twisting the cable between the two bends is higher than 50.

9. The optical cable according to claim 1, wherein when the cable is guided on a path formed by two bends spaced at 0.5 m arranged on orthogonal planes and having a bend radius according to the minimum dynamic bending radius prescribed for the cable, the ratio between the bending work for bending the optical fiber cable around the two bends and the twisting work for twisting the cable between the two bends is higher than 80.

10. The optical cable according to claim 1, wherein when the cable is guided on a path formed by two bends spaced at 0.5 m arranged on orthogonal planes and having a bend radius according to the minimum dynamic bending radius prescribed for the cable, the ratio between the bending work for bending the optical fiber cable around the two bends and the twisting work for twisting the cable between the two bends is higher than 90.

11. The optical cable according to claim 1, comprising a lower bending plane and having a bending stiffness $E*J$ of the cable structure in the lower bending plane of about 0.01 Nm$^2$ to 0.10 Nm$^2$.

12. The optical cable according to claim 1, comprising a lower bending plane having a bending stiffness $E*J$ of the cable structure in the lower bending plane of about 0.01 Nm$^2$ to 0.06 Nm$^2$.

13. The optical cable according to claim 2, wherein a reciprocal distance of axes of the strength longitudinal rods is about 1.5 mm to 5.0 mm.

14. The optical cable according to claim 2, wherein a reciprocal distance of axes of the strength longitudinal rods is about 2.0 mm to 4.0 mm.

15. The optical cable according to claim 2, wherein the strength longitudinal rods have a diameter lower than or equal to about 1 mm.

16. The optical cable according to claim 2, wherein the strength longitudinal rods have a diameter of about 0.4 mm to 0.7 mm.

17. The optical cable according to claim 1, wherein the jacket has an outer diameter of about 3.0 mm to about 6.0 mm.

18. The optical cable according to claim 1, wherein the jacket has an outer diameter of about 4.0 mm to 5.0 mm.

19. The optical cable according to claim 1, wherein the jacket has an outer diameter of about 4.0 mm to 4.5 mm.

20. The optical cable according to claim 1, wherein the at least one strength rod comprises glass-reinforced plastic.

21. The optical cable according to claim 1, wherein the at least one strength rod comprises aramid-reinforced plastic.

22. The optical cable according to claim 1, wherein the at least one strength rod comprises filamentary strands of glass and/or aramid fibers.

* * * * *

UNITED STATES PATENT AND TRADEMARK OFFICE
CERTIFICATE OF CORRECTION

PATENT NO. : 7,333,697 B2
APPLICATION NO. : 10/565634
DATED : February 19, 2008
INVENTOR(S) : Pizzorno et al.

Page 1 of 1

It is certified that error appears in the above-identified patent and that said Letters Patent is hereby corrected as shown below:

On The Title Page Item -57-, Abstract, line 8, "$G*J_p$," should read --$G*J_p$,--.

On The Title Page Item -57-, Abstract, line 9, "$J_p$" should read --$J_p$--.

On The Title Page Item -57-, Abstract, line 10, "$G*J_p$" should read --$G*J_p$--.

Claim 1, column 13, line 61, "$G*J_p$, is" should read --$G*J_p$ is--.

Claim 1, column 13, line 62, "$J_p$, is" should read --$J_p$ is--.

Claim 1, column 13, line 63, "$G*J_p$, is" should read --$G*J_p$ is--.

Claim 3, column 14, line 2, "$G*J_p$, is" should read --$G*J_p$ is--.

Claim 4, column 14, line 4, "$G*J_p$, is" should read --$G*J_p$ is--.

Claim 5, column 14, line 6, "$J_{p,r}$" should read --$J_{p,r}$--.

Claim 6, column 14, line 9, "$J_{p,r}$" should read --$J_{p,r}$--.

Claim 8, column 14, line 21, "0.5 in" should read --0.5 m--.

Claim 11, column 14, line 44, "$E*J$" should read --$E*J$--.

Claim 12, column 14, line 48, "$E*J$" should read --$E*J$--.

Signed and Sealed this

Thirty-first Day of March, 2009

JOHN DOLL
*Acting Director of the United States Patent and Trademark Office*